United States Patent
Sullivan et al.

(10) Patent No.: US 10,749,981 B2
(45) Date of Patent: Aug. 18, 2020

(54) VEHICLE DATA PRE-CONDITIONING

(71) Applicant: Ford Global Technologies, LLC, Dearborn, MI (US)

(72) Inventors: Daniel Sullivan, Grosse Pointe, MI (US); George Hart Vrampas, Southgate, MI (US); Youssef El-Minyawi, East Lansing, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/114,420

(22) Filed: Aug. 28, 2018

(65) Prior Publication Data
US 2020/0076915 A1   Mar. 5, 2020

(51) Int. Cl.
*H04L 29/08* (2006.01)

(52) U.S. Cl.
CPC .......... *H04L 67/2847* (2013.01); *H04L 67/12* (2013.01); *H04L 67/26* (2013.01); *H04L 67/306* (2013.01); *H04L 67/32* (2013.01)

(58) Field of Classification Search
None
See application file for complete search history.

(56) References Cited

U.S. PATENT DOCUMENTS

| | | | |
|---|---|---|---|
| 8,463,869 B2* | 6/2013 | Morse | G06Q 30/02 709/217 |
| 9,020,491 B2* | 4/2015 | Ricci | G06K 9/00832 455/420 |
| 9,379,933 B1* | 6/2016 | Bishop | H04L 29/06476 |
| 9,648,088 B1 | 5/2017 | Pande et al. | |
| 9,680,957 B2 | 6/2017 | Bergmann et al. | |
| 2007/0206247 A1* | 9/2007 | Kaplan | G06Q 30/0645 358/527 |
| 2013/0055321 A1* | 2/2013 | Cline | H04N 21/44209 725/77 |
| 2013/0238762 A1* | 9/2013 | Raleigh | H04L 67/1097 709/219 |
| 2015/0379568 A1* | 12/2015 | Balasubramanian | G10L 13/033 705/14.53 |
| 2016/0044129 A1* | 2/2016 | Bergmann | H04L 67/2847 455/406 |
| 2016/0066004 A1* | 3/2016 | Lieu | H04N 21/2541 725/29 |
| 2017/0032256 A1* | 2/2017 | Otto | H04L 67/22 |
| 2018/0091582 A1 | 3/2018 | Vossen | |
| 2018/0367626 A1* | 12/2018 | Azout | G06F 3/04845 |

* cited by examiner

*Primary Examiner* — Thomas J Dailey
(74) *Attorney, Agent, or Firm* — Michael Spenner; Brooks Kushman PC

(57) ABSTRACT

A vehicle includes a processor programmed to process a user's profile by collecting usage pattern of a user; and responsive to a trigger condition, downloading media data from a server to a local storage for the user according to the user profile before the user uses the media data, and load the media data from the local storage to present to the user responsive to user using the vehicle.

18 Claims, 5 Drawing Sheets

US 10,749,981 B2

VEHICLE DATA PRE-CONDITIONING

TECHNICAL FIELD

The present disclosure is generally related to a data pre-conditioning system. More specifically, the preset disclosure is related to a vehicle system configured to pre-download media data for a user.

BACKGROUND

Many people consume a lot of data during their daily commute using vehicle networks. For instance, a commuter in his own vehicle may live stream music, map, and podcast using his/her vehicle data package while driving. A shuttle passenger may download media contents such as a movie through the shuttle Wi-Fi. These may cause network congestions and increase operational costs for the vehicles.

SUMMARY

In one or more illustrative embodiments of the present disclosure, a vehicle comprises a processor programmed to process a user profile by collecting usage pattern of a user; and responsive to a trigger condition, download media data from a server to a local storage for the user according to the user profile before the user uses the media data, and load the media data from the local storage to present to the user responsive to user using the vehicle.

In one or more illustrative embodiments of the present disclosure, a method for a vehicle comprises creating a user profile by collecting usage pattern of a user; responsive to a trigger condition, wirelessly download media data to a local storage for the user according to the user profile before the user uses the vehicle; and loading the media data from the local storage to present to the user responsive to the user using the vehicle.

In one or more illustrative embodiments of the present disclosure, a vehicle comprises a processor programmed to responsive to receiving a reservation request from a user, download media data associated with a user profile of the user from a server to a local storage before the user users the vehicle, and responsive to connecting to a personal device associated with the user, send the media data from the local storage to the personal device via a wireless connection.

The details of one or more implementations are set forth in the accompanying drawings and the description below. Other features and advantages will become apparent from the description, the drawings, and the claims.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle data pre-conditioning system. More specifically, the present disclosure proposes a vehicle data pre-conditioning system configured to pre-download media data according to a user profile before the user gets on board the vehicle and uses the data. For instance, the vehicle system may pre-download the media data using Wi-Fi while parked for later use by the user en route.

Figure 1:
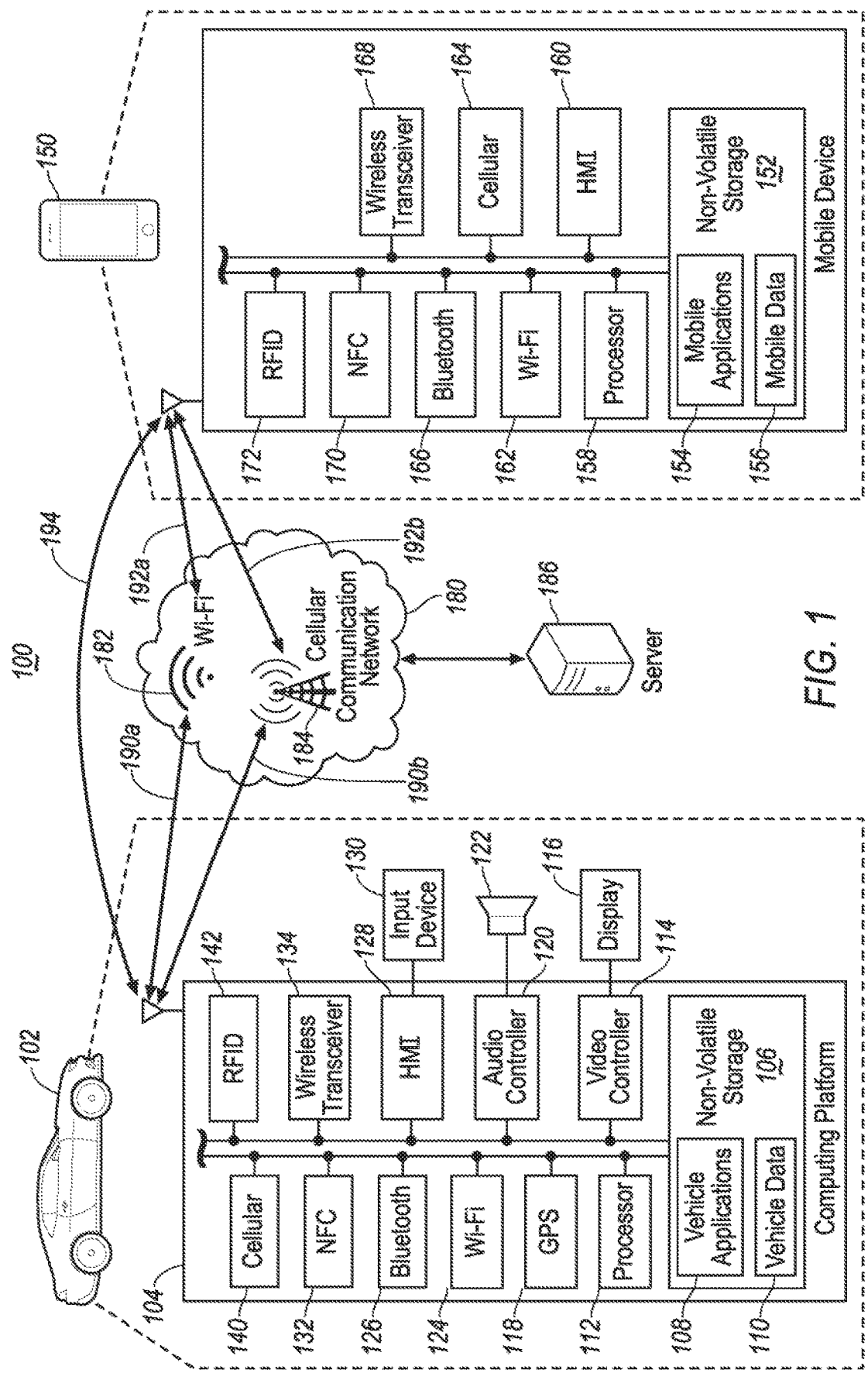
FIG. 1 illustrates an example block topology of a vehicle pre-conditioning system of one embodiment of the present disclosure.

Referring to FIG. 1, an example block topology of a vehicle data pre-conditioning system 100 of one embodiment of the present disclosure is illustrated. The vehicle data pre-conditioning system 100 may generally include a vehicle 102, a mobile device 150, a communication network 180 and a server 186. It should be noted that the illustrated system 100 is merely an example, and more, fewer, and/or differently located elements may be used.

The vehicle 102 may include various types of automobile, crossover utility vehicle (CUV), sport utility vehicle (SUV), truck, recreational vehicle (RV), shuttle bus, boat, plane, or other mobile machine for transporting people or goods. In many cases, the vehicle 102 may be powered by an electric motor. As another possibility, the vehicle 102 may be a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the vehicle 102 may include the SYNC system manufactured by The Ford Motor Company of Dearborn, Mich.

As illustrated in FIG. 1, a computing platform 104 of the vehicle 102 may include one or more processors 112 configured to perform instructions, commands, and other routines in support of the processes described herein. For instance, the computing platform 104 may be configured to execute instructions of vehicle applications 108 to provide features such as navigation, satellite radio decoding, and data pre-conditioning. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 128 configured to provide for occupant interaction with the vehicle 102. As an example, the computing platform 104 may interface with one or more input devices 130 or other HMI controls (e.g., steering wheel audio buttons, a push-to-talk button, instrument panel controls, etc.) configured to invoke functions on the computing platform 104 as well as other components of the vehicle 102.

The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The computing platform 104 may also drive or otherwise communicate with one or more speakers 122 configured to provide audio output to vehicle occupants by way of an audio controller 120. The computing platform 104 may also be provided location features through a global positioning system (GPS) controller 124.

The computing platform 104 may be configured to communicate with a mobile device 150 of the vehicle user via a wireless connection 194. The mobile device 140 may be any of various types of portable computing device, such as cellular phones, tablet computers, smart watches, laptop computers, portable music players, or other device capable of communication with the computing platform 104. In many examples, the computing platform 104 may include a wireless transceiver 134 in communication with a Wi-Fi controller 124, a Bluetooth controller 126, a near-field communication (NFC) controller 132, a cellular controller 140, a radio-frequency identification (RFID) controller 142, and other controllers such as a Zigbee transceiver, an IrDA transceiver (not shown), configured to communicate with a compatible wireless transceiver 168 of the mobile device 140. The wireless transceiver 134 may be additionally configured to communicate with a server 186 via a communication network 180 through a wireless connection 190. Media data used by users may be downloaded from the server 186 via the communication network 180. As a few non-limiting examples, the communication network 180 may include a Wi-Fi connection 182, a cellular connection 184 and other types of connections (not shown).

The mobile device 150 may be provided with a processor 158 configured to execute instructions of mobile applications 154 to provide features such as phone calls, wireless communication, multi-media processing, and shuttle reservation. The mobile device 158 may be provided with various features allowing the vehicle occupants/users to interface with the mobile device 150. For instance, the mobile device 150 receive input from HMI controls 160 configured to provide for occupant interaction with the mobile device 150 as well as the vehicle 102. As an example, the HMI controls may be configured to interface with one or more touch screen or buttons (not shown) to invoke functions on the mobile device 150 as well as the other components of the vehicle 102.

The mobile device 150 may include a wireless transceiver 168 in communication with a Wi-Fi controller 162, a cellular controller 164, a Bluetooth controller 166, a NFC controller 170, a RFID controller 172 and other controllers configured to communicate with the compatible wireless transceiver 132 of the computing platform 104 via the wireless connection 194. The wireless transceiver 168 may be additionally configured to communicate with the server 186 via the communication network 180 through a wireless connection 192. It is noted that both the server 186 and the communication network 180 are general terms in the present disclosure, and they are not intended to refer to any particular server computer or communication network.

Figure 2:
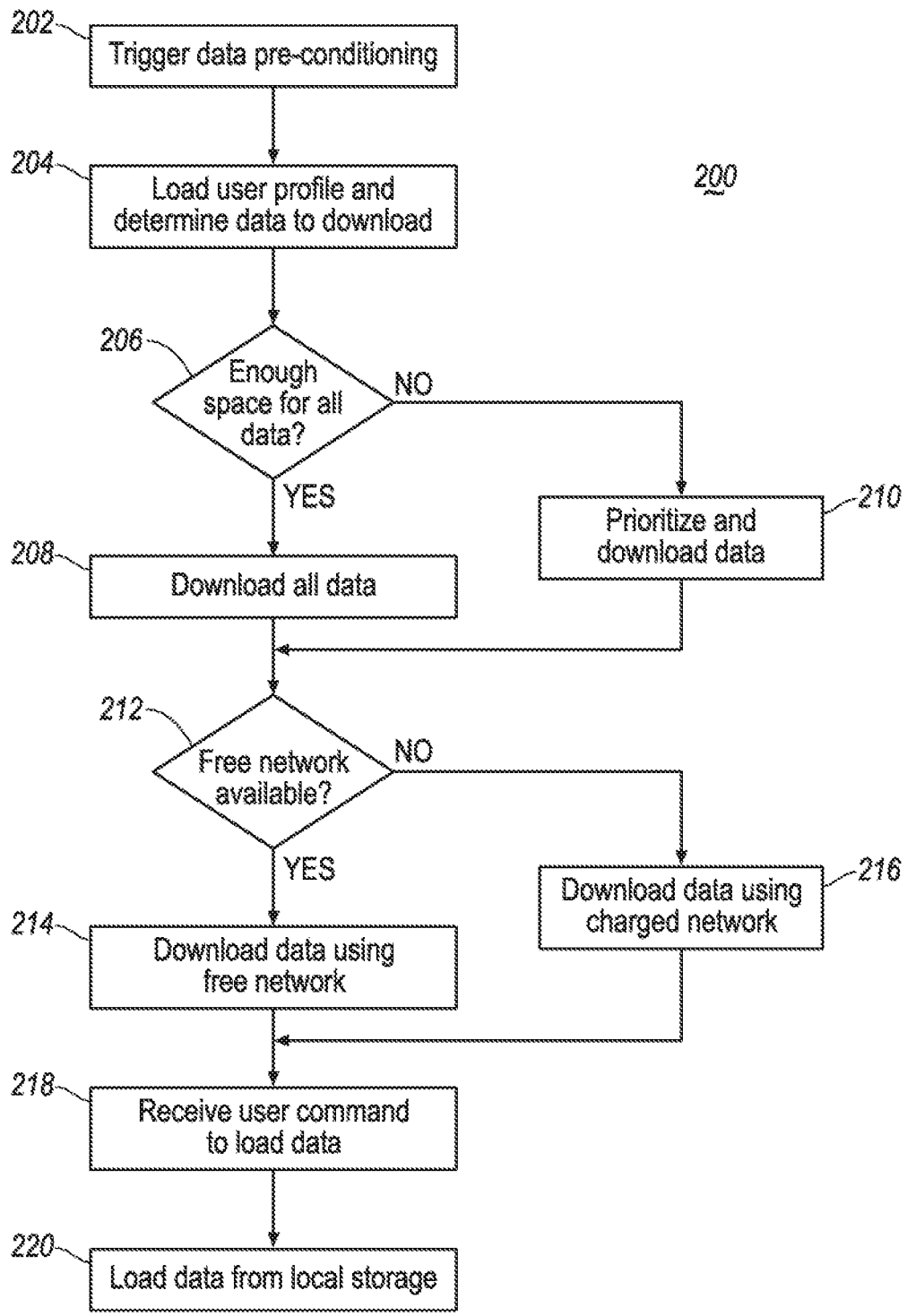
FIG. 2 illustrates an example flow diagram for vehicle data pre-conditioning of one embodiment of the present disclosure.

Referring to FIG. 2, an example flow diagram for a process 200 for vehicle data pre-conditioning is illustrated. With continuing reference to FIG. 1, at operation 202, the computing platform 104 triggers the data pre-conditioning process. The data pre-conditioning process may be triggered by a variety of conditions. As a few non-limiting examples, those triggering conditions may include a predefined location, time, wireless connections and etc. In case that the vehicle 102 is a shuttle bus, the trigger condition may include the computing platform 104 receiving a reservation request from a user device such as the mobile device 150.

At operation 204, the computing platform 104 loads a user profile to determine what media data to download. The user profile may be previously stored in the storage 106 as a part of vehicle data 110. Additionally or alternatively, the computing platform 104 may receive a user profile from a user device such as the mobile device 150. The user profile may indicate the user's preference on what specific or general type of data is needed for his/her upcoming trip in the vehicle 102.

At operation 206, the computing platform 104 determines whether there is enough space in the storage 106 to store all the data to be downloaded. The computing platform 104 may be configured to allow the download data to use all space of the storage 106. Alternatively, a pre-set amount of space (e.g. 500 MB) may be pre-set for storing the download media data.

If there is enough space in the storage 106 for all media data, the process proceeds to operation 208 and the computing platform 104 starts to download all media data. Otherwise, if there is not enough space, the process proceeds to operation 210. At operation 210, the computing platform 104 prioritizes the media data to download. The prioritization may be performed using rules previously set by the user.

For instance, the user may set news and weather data to be of high priority, and entertainment data (e.g. music and movies) be of low priority. Additionally or alternatively, the computing platform 104 may prioritize the most used data over less frequently used data according to previous usage pattern of the user. The priority setting may be integrated as a part of the user profile. Alternatively, the computing platform 104 may be configured to determine the usage pattern of a particular user over time and generate his/her priority setting.

At operation 212, the computing platform 104 determines whether a free-of-charge network is available. For instance, a free-of-charge network may include a Wi-Fi network that the computing platform 104 is authorized to connect to, such as a home Wi-Fi network belong to the user of the vehicle 102. If the free-of-charge network is available, the process proceeds to operation 214 and the computing platform 104 starts to download the media data using the free-of-charge network. The downloaded media data may be stored in the storage 106 as a part of vehicle data 110. Otherwise, if a free-of-charge network is not available, the process proceeds to operation 216 and the computing platform 104 starts do download the media data using a metered/charged network, such as a cellular communication network 184. The vehicle user may be provided with an option to not download with a metered/charged network to avoid extra charges. If that is selected, the process ends without downloading the data using the metered/charge network.

At operation 218, the computing platform 104 receives a user command to load the data. The user command may be received from the input device 130 via HMI controls 128. As an example, the user may launch a program as a part of the vehicle application 108 to play headline news via HMI controls 128 after starting to use the vehicle 102. Additionally or alternatively, the user may input command to load the media data using the mobile device 150 connected to the computing platform 104 via the wireless connection 194.

Responsive to the user command, at operation 220, the computing platform 104 loads the media data from the local storage 106 to present to the user. The computing platform may load and process the data and output the media content directly using the speaker 122 via the audio controller and/or the display 116 via the video controller 114. Additionally or alternatively, the computing platform 104 may send the media data to the mobile device 150 via the wireless connection 194 for processing and output.

The operations of process 200 may be applied to various situations. In one example, the vehicle 102 may be a private vehicle of a user for daily commute. Through regular operation of the vehicle 102, the computing platform 104 may learn the usage pattern of the particular user and generate a user profile. Additionally or alternatively, the computing platform 104 may learn the usage pattern through other user devices separated from the vehicle 102. For instance, the computing platform 104 may be associated with devices such as Google Home Smart Speaker, Amazon Echo, Apple HomePod and etc. of the user to acquire using information. For instance, the computing platform 104 may be associated with those devices by a user account.

With the user profile, the computing platform 104 may also determine conditions for media data pre-conditioning. For instance, if the vehicle 102 is usually parked overnight at places having Wi-Fi coverage (e.g. the user's garage), and the user usually start to use the vehicle 102 at around 8 am on a working day, the computing platform may trigger the data pre-conditioning at 7:30 am to download data that the user is likely to use if both the time and location conditions are met. Alternatively, the user may manually set trigger conditions for data pre-conditioning.

The media data may be downloaded and stored in the local storage 106 for a specific period of time (e.g. 24 hours). Additionally or alternatively, the data may be automatically deleted after the user uses it. For instance, news data may be deleted shortly after it has been played as the user is unlikely to listen to it again. For music and movie data, it may be stored for longer time for replay. The computing platform 104 may check how much space is available for media data before starting to download. A specific size of space may be allocated to store the media data for pre-conditioning. For instance, the computing platform 104 may set a daily allocation of 500 MB for media data. Depending on the total storage space, network condition, and other factors, the allocation size may vary.

If the allocated space is enough for all media data, the computing platform 104 may start to download all data. If, however, the allocated space is not enough for all media data, the computing platform 104 may prioritize the media data and download only the prioritized data. The computing platform 104 may prioritize data that is more likely to be used by the user during the next trip. For instance, if both news and music are among the media data to be downloaded and the computing platform 104 determines the user listens to the news more often than the music according to the past usage pattern, news data may be prioritized over music to be downloaded.

Preferably, the computing platform 104 may be configured to use free-of-charge network to download the media data if they are available. For instance, the vehicle 102 may be parked in a garage or near a house of the user covered by a home Wi-Fi network 182. Additionally or alternatively, the user may be subscribed a monthly package to local Wi-Fi networks such as Xfinity Wi-Fi which does not incur extra fee by downloading the media content if the user has already subscribed to it. If such free-of-charge networks are not available, the computing platform 104 may switch to a charged network to download the data. A charged network may include a cellular network 184 that the vehicle 102 is subscribed to. Alternatively, the computing platform 104 may be configured to not download with a charged network to avoid extra charges.

Depending on the network coverage speed and the size of data to download, the pre-conditioning process may or may not be finished when the user starts to use the vehicle 102. If not finished yet, the computing platform 104 may continue the pre-conditioning process while the user starts to use the vehicle 102 and load the data from the local storage 106. The user may manually start to play the downloaded media content. Alternatively, the computing platform 104 may load and play the media data automatically responsive to detecting the user starting to use the vehicle 102.

The operation of the process 200 may also be applied to situations in which the vehicle 102 is shuttle bus. In this example, the vehicle 102, being a shuttle bus, may be configured to receive reservations via the communication network 180. A passenger may use a user device to place reservations. For instance, the user may use the mobile device 150 with the help of software as a part of the mobile applications 154 to reserve a pickup service. Responsive to receiving the reservation, the computing platform 104 may trigger data pre-conditioning for that specific passenger by loading his user profile to determine what media data to download.

The following operations are similar to those described in the above example. In general, the computing platform 104 may determine whether there is enough space for the media data and prioritize the data if necessary. Next, the computing platform 104 may download the data wirelessly preferably using a free-of-charge network (e.g. Wi-Fi at a bus station/garage). When the passenger gets onboard the shuttle 102, the computing platform 104 may load the media data stored locally in the storage 106 and send it to the mobile device 150 which belongs to the passenger via the wireless connection 194 for output.

Figure 3:
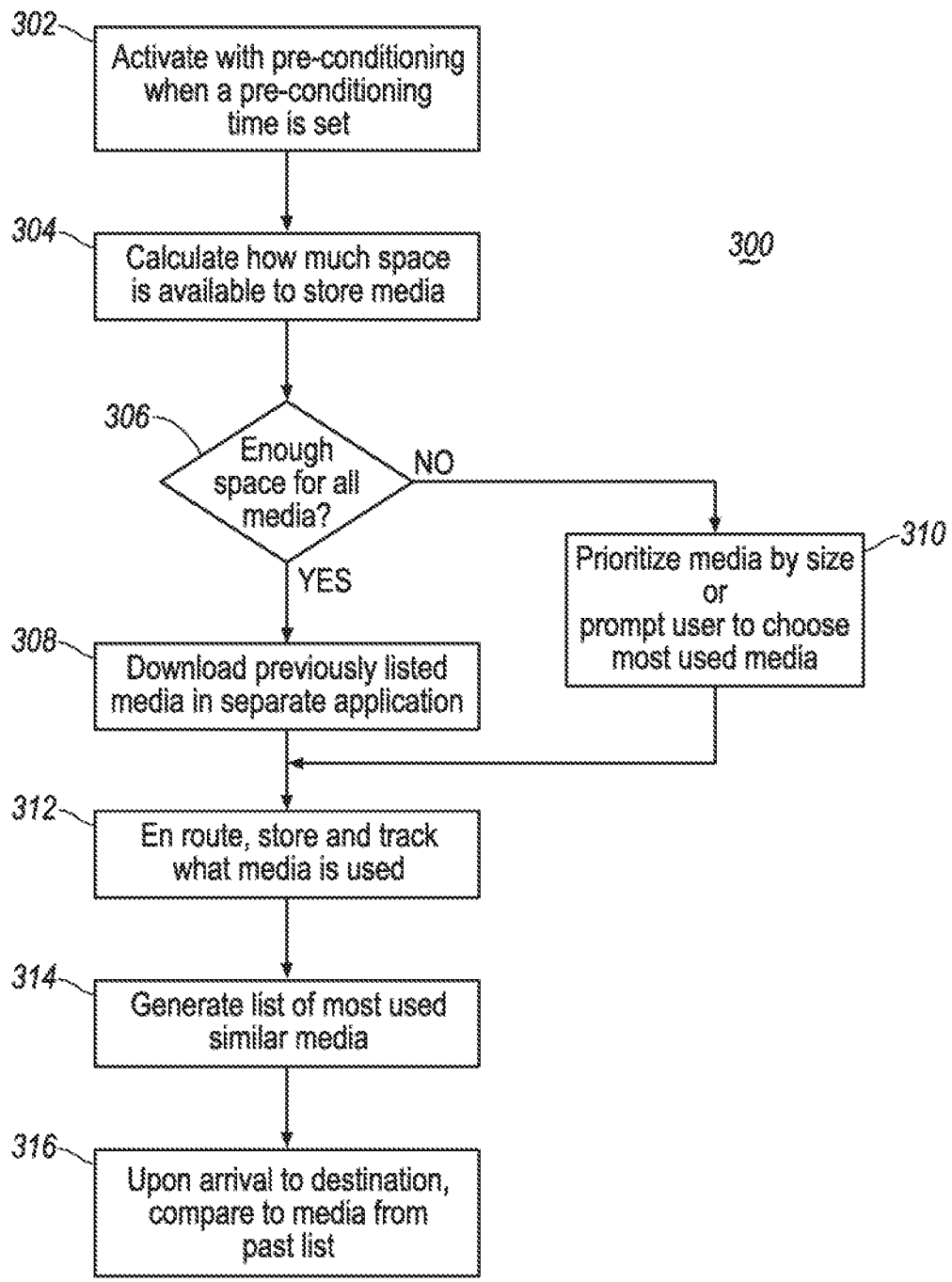
FIG. 3 illustrates an example flow diagram for vehicle routine learning during a learning period of one embodiment of the present disclosure.

Referring to FIG. 3, an example flow diagram for a process 300 for vehicle routine learning during a learning period is illustrated. The learning period may be set to any length of time (e.g. one week). At operation 302, the computing platform 104 activates with data pre-conditioning when a pre-condition time is set. The pre-conditioning time may be manually set by the vehicle user, or alternatively automatically set by the computing platform 104. At operation 304, the computing platform 104 calculates how much space is available to store media data for download. If, at operation 306, the computing platform 104 determines the space is enough for all media data, the process proceeds to operation 308 to download all previously listed media data in separate applications. If there is not enough space for all media data, the process proceeds to operation 310 and the computing platform 104 prioritize media data by size or prompt user to choose the most used media. As an example, the computing platform 104 may prioritize data with larger size over data with smaller size. Alternatively, the computing platform 104 may prompt a message via HMI controls 128 and let the user to choose the most used media data to download.

En route, at operation 312, the computing platform 104 stores and tracks what media is used and what is not used, and at operation 314 generates a list of most used similar media according to the tracking results. At operation 316, when the vehicle 102 arrives at its destination, the computing platform 104 compares most used similar media listed to media from the past list.

Figure 4:
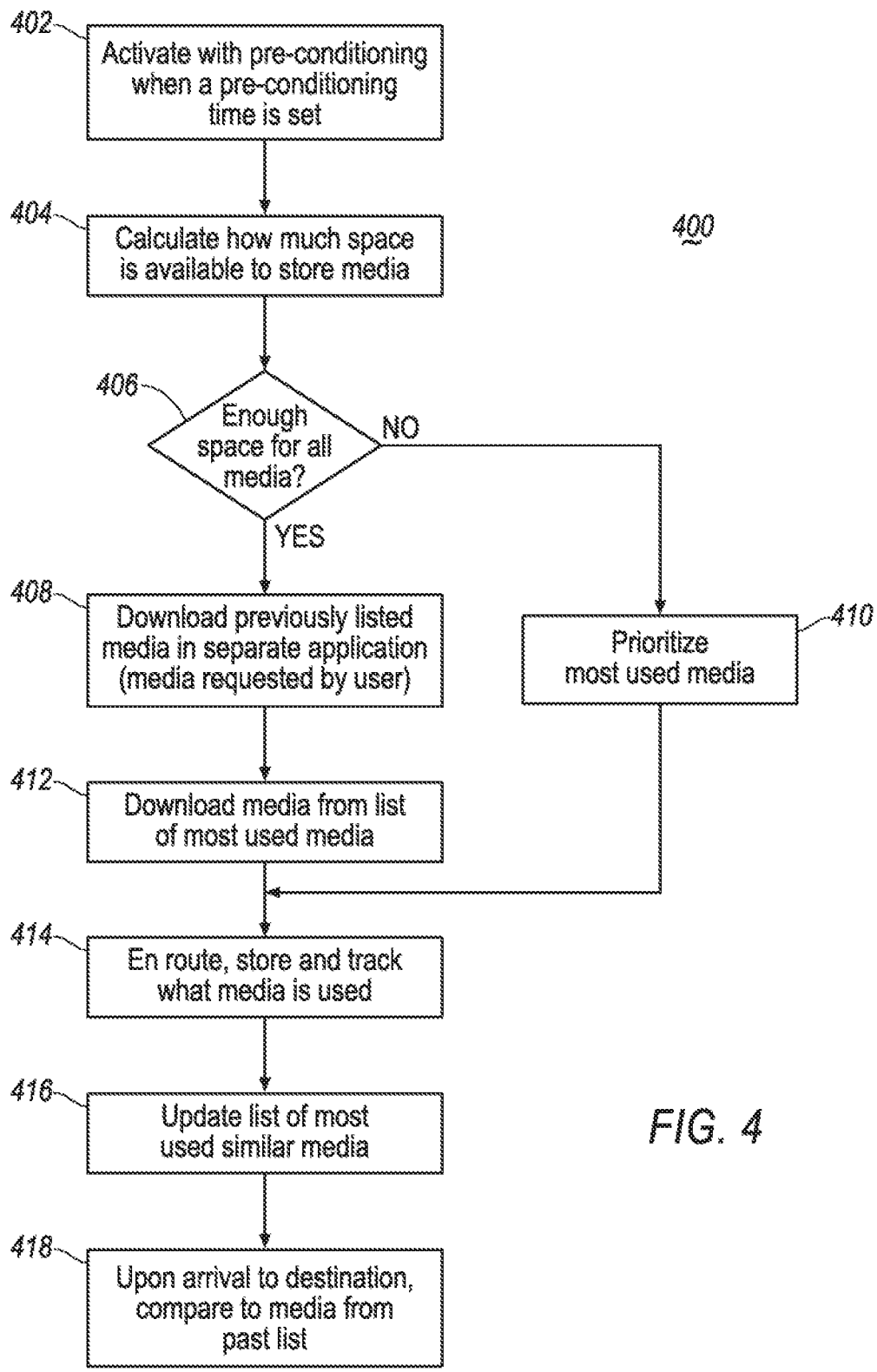
FIG. 4 illustrates an example flow diagram for vehicle routine learning during a post learning period of one embodiment of the present disclosure.

Referring to FIG. 4, an example flow diagram for a process 400 for vehicle routine learning during a post learning period is illustrated. After the learning period illustrated in FIG. 3, the computing platform 104 may enter the post learning period to keep the user profile updated. Operations 402-406 are generally the same to as operations 302-306 in FIG. 3. If there is enough space to all media data, the process proceeds to operation 408 and the computing platform downloads previously listed media data in separate application. Additionally, the computing platform 104 may also download media requested by user. The user may want to use some specific media during his/her trip and request the computing platform 104 to pre-condition the media data manually via HMI controls 128 or a user device such as the mobile device 150. If, at operation 406, the computing platform 104 determines there is not enough space for all media data, the process proceeds to operation 410 and the most used media data will be prioritized.

En route, at operation 414, the computing platform 104 stores and tracks what media is used and what is not used by the user, and at operation 416 updates the list of most used similar media according to the tracking results. At operation 418, when the vehicle 102 arrives at its destination, the computing platform 104 compares most used similar media listed to media from the past list.

Figure 5:
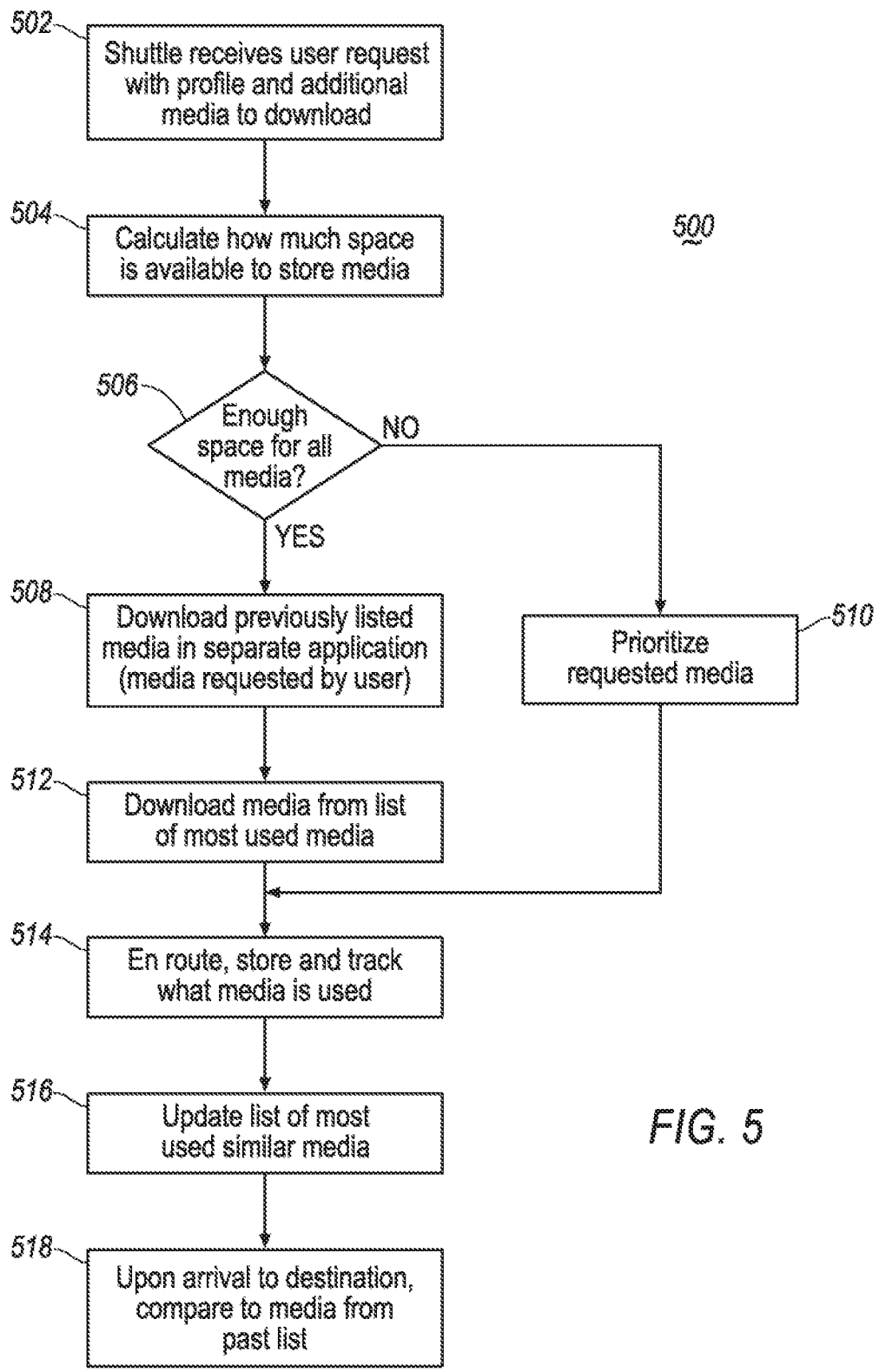
FIG. 5 illustrates an example flow diagram for a shuttle service of one embodiment of the present disclosure.

Referring to FIG. 5, an example flow diagram for a process 500 for a shuttle service is illustrated. At operation 502, the shuttle vehicle 102 receives a user reservation request with user profile and additional media to download. The user may send out the reservation request via the mobile device 150 using mobile application 154 along with user profile stored in the storage 152 as a part with the mobile data 156. The user may also send out additional media to download with the request. For instance, the user may manually select to download one or more YouTube videos to playback during his/her trip in the shuttle.

Responsive to receiving the user reservation request, the computing platform 104 calculates how much space needed for download the media data and how much space is allocated to the user. A specific size allocation may be assigned to each user. The computing platform 104 may be configured to allow different sizes of allocations for different users. For instance, a larger size allocation may be assigned to premium users who pays more for the shuttle service than non-premium users. If there is enough space to all media data for the user, the process proceeds to operation 508 and the computing platform 104 downloads all previously listed media data in separate application as well as media requested by user. At operation 512, the computing platform 104 downloads media data from the list of the most used media. If, at operation 506, the computing platform 104 determines there is not enough space for all media data for the user, the process proceeds to operation 510 and the most used media data will be prioritized.

En route, at operation 514, the computing platform 104 stores and tracks what media is used and what is not used by the user. The user may be load and playback the media using the mobile device 150 via the wireless connection 194. At operation 516 updates the list of most used similar media according to the tracking results. At operation 518, when the vehicle 102 arrives at its destination, the computing platform 104 compares most used similar media listed to media from the past list.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a processor programmed to
identify for a user a media data usage pattern based on how often the user consumes different types of media while in the vehicle,
update a user profile describing media consumption habits of the user with the media data usage pattern,
identify media data for download from remote servers to a local storage of the vehicle that corresponds to the different types of media according to the user profile,
responsive to the vehicle being at a predefined location during a predefined time period, determine whether the local storage has sufficient space to store all the media data, and
responsive to the local storage having insufficient space to store all the media data, download only portions of the media data from the remote servers to the local storage according to a prioritization setting defined by the media data usage pattern such that the portions correspond to most often consumed types of the different types of media.

2. The vehicle of claim 1, wherein the processor is further programmed to delete the portions of the media data from the local storage upon expiration of respective time periods that depend on the most often consumed types.

3. The vehicle of claim 2, wherein one of the most often consumed types is audio data and another one of the most often consumed types is video data, and wherein the time period corresponding to the audio data is less than the time period corresponding to the video data.

4. The vehicle of claim 2, wherein one of the most often consumed types is news data and another one of the most often consumed types is movie data, and wherein the time period corresponding to the news data is less than the time period corresponding to the movie data.

5. The vehicle of claim 2, wherein one of the most often consumed types is news data and another one of the most often consumed types is music data, and wherein the time period corresponding to the news data is less than the time period corresponding to the music data.

6. The vehicle of claim 1, wherein the processor is further programmed to receive a reservation request for the vehicle from an electronic device.

7. The vehicle of claim 1, wherein the processor is further programmed to provide some of the portions of the media data to an electronic device of the user via a wireless connection.

8. The vehicle of claim 7, wherein the wireless connection includes Wi-Fi, Bluetooth, near-field communication (NFC), or radio-frequency identification (RFID).

9. A method for a vehicle, comprising:
identifying for a user a media data usage pattern based on how often the user consumes different types of media while in the vehicle;
updating a user profile describing media consumption habits of the user with the media data usage pattern;
responsive to establishing a connection with a network,
identifying media data for download from remote servers accessible via the network to a local storage of the vehicle that corresponds to the different types of media according to the user profile, and
determining whether the local storage has sufficient space to store all the media data; and
responsive to the local storage having insufficient space to store all the media data, downloading only portions of the media data from the remote servers to the local storage according to a prioritization setting.

10. The method of claim 9, wherein the prioritization setting is defined via input from the user.

11. The method of claim 10, wherein the prioritization setting causes the portions of the media data having larger size to be downloaded before the portions of the media data having smaller size.

12. The method of claim 9, further comprising deleting the portions of the media data from the local storage upon expiration of respective time periods that depend on types of the portions of the media data.

13. The method of claim 9, further comprising selecting the network.

14. A vehicle, comprising:
a processor programmed to
responsive to receiving a reservation request for the vehicle from a user, load a profile of the user that includes (i) a media data usage pattern describing how often the user consumes different types of media and (ii) a user privilege defining a size of allocated storage space for the user on a local storage of the vehicle,
identify media data for download from remote servers to the local storage that corresponds to the different types of media according to the profile,
responsive to the vehicle being at a predefined location and connected to a predefined network, determine whether the size is sufficient to store all the media data, and
responsive to the size being insufficient to store all the media data, download only portions of the media data from the remote servers to the local storage according to a prioritization setting defined by the media data usage pattern such that the portions of the media data correspond to most often consumed types of the different types of media.

15. The vehicle of claim 14, wherein the processor is further configured to, after the user accesses the portions of the media data, delete the portions of the media data from the local storage.

16. The vehicle of claim 14, wherein the processor is further configured to delete the portions of the media data from the local storage upon expiration of respective time periods that depend on the most often consumed types.

17. The vehicle of claim 16, wherein one of the most often consumed types is news data and another one of the most often consumed types is movie data, and wherein the time period corresponding to the news data is less than the time period corresponding to the movie data.

18. The vehicle of claim 16, wherein one of the most often consumed types is news data and another one of the most often consumed types is music data, and wherein the time period corresponding to the news data is less than the time period corresponding to the music data.

* * * * *